United States Patent [19]
Han

[11] Patent Number: 6,008,998
[45] Date of Patent: Dec. 28, 1999

[54] AC/DC POWER SUPPLY CIRCUIT

[75] Inventor: Jong-Hee Han, Suwon, Rep. of Korea

[73] Assignee: Samsung Electronics Co., Ltd, Rep. of Korea

[21] Appl. No.: 09/086,229

[22] Filed: May 28, 1998

[30] Foreign Application Priority Data

Jun. 19, 1997 [KR] Rep. of Korea .................. 97-25685

[51] Int. Cl.$^6$ .................................................. H02M 3/335
[52] U.S. Cl. .................................. 363/16; 363/21; 307/28
[58] Field of Search ................................. 363/19, 20, 21, 363/65, 97, 131, 17, 16; 307/26, 28, 58

[56] References Cited

U.S. PATENT DOCUMENTS

| | | | |
|---|---|---|---|
| 3,873,846 | 3/1975 | Morio et al. | 363/21 X |
| 4,675,797 | 6/1987 | Vinciarelli | 363/21 |
| 4,695,934 | 9/1987 | Steigerwald et al. | 363/17 |

*Primary Examiner*—Y. J. Han
*Attorney, Agent, or Firm*—Dilworth & Barrese

[57] ABSTRACT

An AC/DC power supply circuit is provided. In the AC/DC power supply circuit, output lines of a DC power supply unit including a multitap transformer are connected to output ends of a secondary winding of a multitap transformer in an AC power supply unit, or an output line of the DC power unit is connected to a leading end of a primary winding of the multitap transformer in the AC power supply unit.

3 Claims, 3 Drawing Sheets

AC/DC POWER SUPPLY CIRCUIT

BACKGROUND OF THE INVENTION

1. Field of the Invention

The present invention relates to a power supply device, and in particular, to an AC (Alternating Current)/DC (Direct Current) power supply circuit for supplying both AC and DC voltages.

2. Description of the Related Art

A power supply device is provided for an electronic product such as, for example, a camcorder, a VCR (Video Cassette tape Recorder), or a TVCR which is a combined to product of a TV and a VCR.

FIG. 1 is a schematic diagram of a conventional AC/DC power supply circuit in application to a TVCR product model TVCR9D1 of Funai Electric Co. Japan. Referring to FIG. 1, a voltage generated from an AC power source 2 is transformed in a transformer 4, rectified in a diode 6, and smoothed in a capacitor 8. Hence, the AC voltage is converted to an about 12V DC voltage. The 12V DC voltage is supplied to various ICs (Integrated Circuits), a tuner, a motor, a microcomputer, a flyback transformer (FBT) 16 serving as a high voltage generator in a TVCR. When the DC voltage is supplied to the microcomputer, it passes through a regulator 14. In FIG. 1, a DC power supply unit 10 for directly supplying the 12V DC voltage is included in the AC/DC power supply circuit to render a corresponding product portable. A 12V DC power source 11 in the DC power supply unit 10 is supplied to the ICs, tuner, motor, microcomputer, and the FBT 16 in the TVCR, via a diode 12.

The FBT 16, generally operated at 125V, is redesigned to operate at 12V in the AC/DC power supply circuit of FIG. 1.

The AC/DC power supply circuit of FIG. 1 requires a transformer of a very high capacity, and generates much heat due to transformation from a high voltage to a low voltage. Further, the FBT 16 requires redesign depending on the size of a TVCR monitor, and a VCR cannot operate with a TV turned off because a secondary power supply of the FBT 16 is used as a VCR power supply. Therefore, for programmed recording requiring no display on a TV monitor, the VCR operates with the TV monitor muted. Here, muting the TV monitor refers to turning off the TV monitor while an operational power voltage is still supplied to the TV. Thus, unnecessary power is supplied to the other circuits and drivers except for TV monitor-related circuits and drivers, thereby increasing power consumption.

SUMMARY OF THE INVENTION

An object of the present invention is to provide an AC/DC power supply circuit for reducing power consumption.

Another object of the present invention is to provide an AC/DC power supply circuit which obviates the need for redesigning an FBT depending on product sets or loads.

Still another object of the present invention is to provide an AC/DC power supply circuit for enabling programmed recording even with a DC power supply voltage.

A further object of the present invention is to provide an AC/DC power supply circuit for minimizing the influence of noise generated when an input AC voltage is converted to a DC voltage.

To achieve the above objects, there is provided an AC/DC power supply circuit applied to a composite electronic product. The AC/DC power supply circuit includes an AC power supply unit and a DC power supply unit. The AC power supply unit has a rectifier for rectifying an input AC voltage, an AC transformer for transforming the rectified AC voltage to a plurality of output voltages suitable for the composite electronic product, and an output voltage controller for controlling a primary voltage of the AC transformer by means of a secondary voltage thereof, in order to control the output voltages. The DC power supply unit has a DC power source for supplying a DC voltage, and a DC transformer for transforming the DC voltage to a power supply voltage corresponding to the primary voltage of the AC transformer, and applying the transformed voltage to an output line of the rectifier of the AC power supply unit.

According to another aspect of the present invention, there is provided an AC/DC power supply circuit applied to a composite electronic product. The AC/DC power supply circuit includes an AC power supply unit and a DC power supply unit. The AC power supply unit has a rectifier for rectifying an input AC voltage, an AC transformer for transforming the rectified AC voltage to a plurality of output voltages suitable for the composite electronic product, and an output voltage controller for controlling a primary voltage of the transformer by means of a secondary voltage thereof, in order to control the output voltages. The DC power supply unit has a DC power source for supplying a predetermined DC voltage, and a DC transformer for transforming the DC voltage to a plurality of output voltages corresponding to the plurality of output voltages generated by the AC transformer, and applying the transformed voltages to a plurality of output lines at a secondary side of the AC transformer of the AC power supply unit.

BRIEF DESCRIPTION OF THE DRAWINGS

The objects and advantages of the present invention will become more apparent by describing in detail preferred embodiments thereof with reference to the attached drawings in which.

DETAILED DESCRIPTION OF PREFERRED EMBODIMENTS

Figure 1:
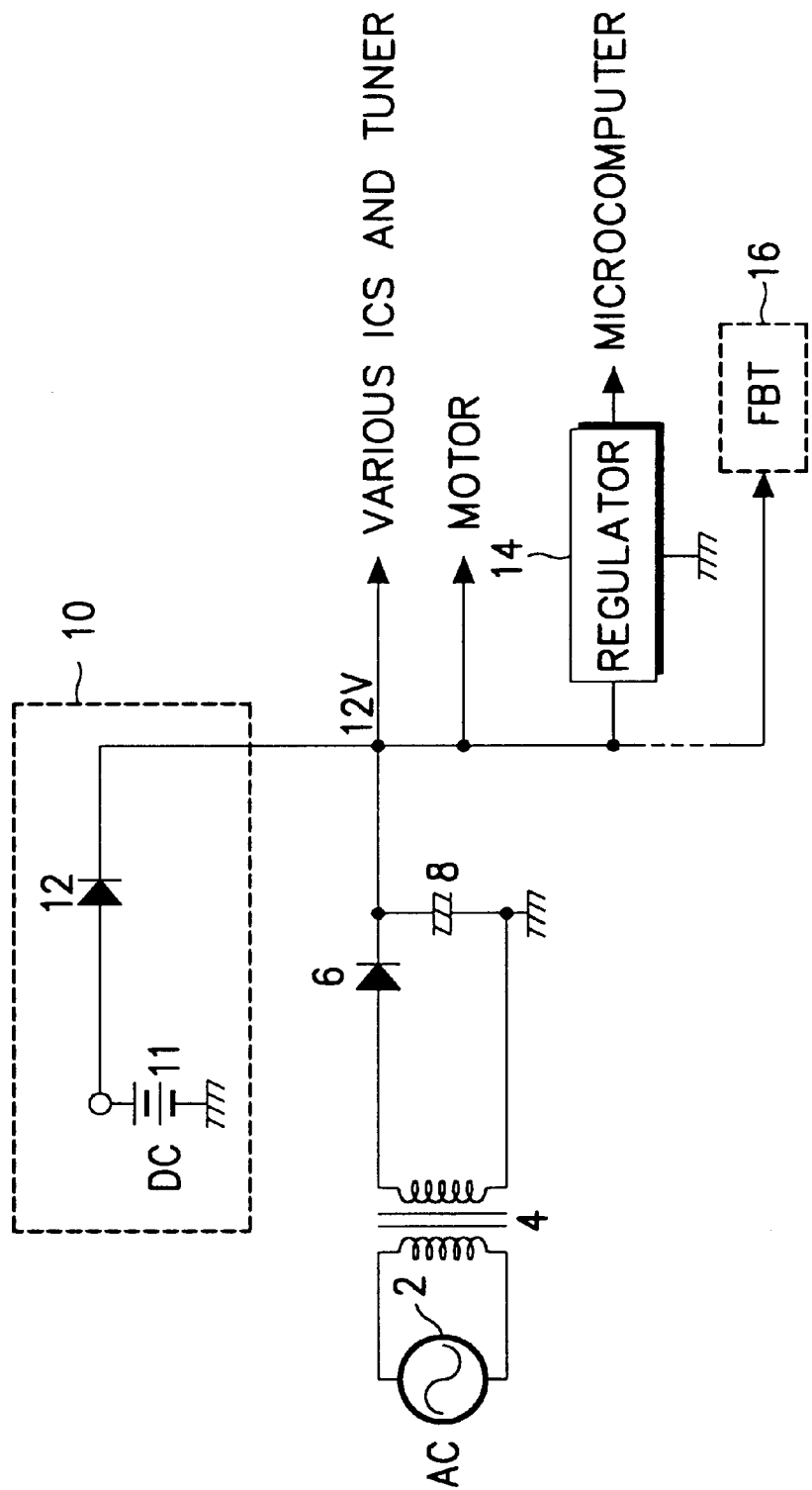
FIG. 1 is a schematic view of a conventional AC/DC power supply circuit.

Preferred embodiments of the present invention will be described in detail with reference to the attached drawings. Like reference numerals denote the same components in the drawings, and a detailed description of known operation and structure of the present invention will be avoided lest it should obscure the subject matter of the present invention. Further, while many specific details including various voltage levels and circuit devices are disclosed for better understanding of the present invention, they are mere exemplary applications. Therefore, it should be appreciated that the present invention is not limited to the specified disclosure.

Figure 2:
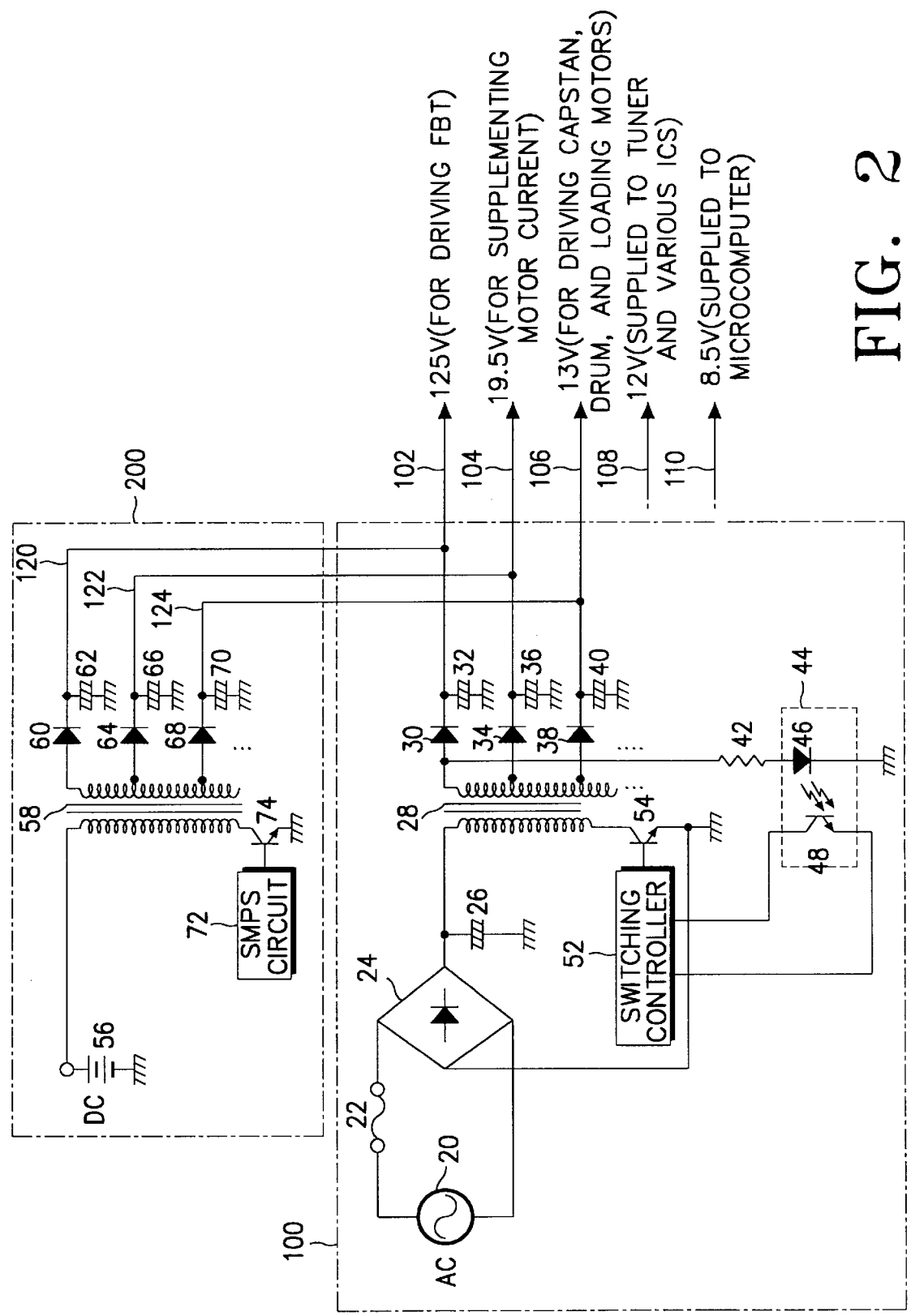
FIG. 2 is a schematic view of an AC/DC power supply circuit according to an embodiment of the present invention.

FIG. 2 is a schematic view of an AC/DC power supply circuit according to a first embodiment of the present invention in an exemplary application to a composite electronic product, such as a TVCR. Referring to FIG. 2, the AC/DC power supply circuit has an AC power supply unit 100 and a DC power supply unit 200.

The AC power supply unit 100 includes an AC power source 20, a fuse 22, a full wave rectifier 24, a smoothing capacitor 26, an AC multitap transformer 28, a photo coupler 44, a switching controller 52, and a power transistor 54. A secondary winding of the AC multitap transformer 28 is connected to a plurality of voltage output lines 102, 104, 106, 108, and 110 by a plurality of taps. Voltages output to the voltage output lines 102, 104, 106, 108, and 110 are, for example, 125V for driving an FBT, 19.5V for supplementing a motor current, 13V for driving a capstan motor, a drum motor, and a loading motor, 12V supplied to a tuner and various ICs, and 8.5V supplied to a microcomputer. The respective voltage output lines 102, 104, 106 are respectively connected to rectifying diodes 30, 34, 38, and smoothing capacitors 32, 36, 40. Voltage output lines 108 and 110 are connected in a similar manner as lines 102, 104 and 106 including similar rectifying diodes and smoothing capacitors, but for the sake of clarity in the figure, the individual rectifying diodes and smoothing capacitors are not shown. The full wave rectifier 24 receives an AC voltage (e.g. 110–280V) supplied from the AC power source 20 via the fuse 22, full wave-rectifies the AC voltage, and outputs the rectified AC voltage to the smoothing capacitor 26. The smoothing capacitor 26 smooths the received AC voltage, thereby eventually converting the AC voltage to a DC voltage. Then, the DC voltage is applied at about 150V to a primary winding of the AC multitap transformer 28.

The AC multitap transformer 28 outputs the rectified power voltage supplied at the primary winding to the voltage output lines 102, 104, 106, 108, and 110, as the aforementioned various voltages. The photocoupler 44, including a light emitting diode 46 and a light receiving transistor 48, operates at the voltage level of the voltage output line 102, and applies a corresponding control voltage to the switching controller 52. The switching controller 52 turns on or off the power transistor 54 connected to the AC multitap transformer 28 by providing a value corresponding to the control voltage as a pulse width. The output voltage of the AC multitap transformer 28 is controlled to an intended level in accordance with the on or off state of the power transistor 54.

Particularly, the photocoupler 44 senses the current value of the secondary voltage, 125V, of the transformer 28 and provides the switching controller 52 with the above current value in order that the controller 52 maintains the secondary voltage uniformly by changing the pulse duty supplied to the base terminal of the power transistor 54, according to the above current value. It is to be appreciated that if the photocoupler 44 were not included in the unit 100, the secondary voltage from the transformer 28 varies with the variation of a load. For example, in the case of a composite electronic product (e.g., TVCR), the secondary voltage exhibits an unstable state while programmed recording is being performed in the state of PICTURE OFF (i.e., TV monitor off, explained above) because the load is minimized in this state. Additionally, the photocoupler 44 is also used to provide isolation since the primary part of the transformer 28 is the active (that is, imaginary ground) source of electric power but the secondary part of the transformer 28 is the inactive (that is, earth ground) source of electric power.

The operation of the unit 100 is as follows. First, the photocoupler 44 transmits the change of current passing through the resistor 42 and the diode 46 to the light receiving transistor 48. Next, the light receiving transistor 48 senses the above change and changes an oscillator, which uses a charging and discharging feature of a condenser built in a Hybrid-IC, of a drive terminal included in the controller 52. It is to be appreciated that the component structure of the switching controller 52 and component functions thereof (including oscillator, condenser, drive terminal, etc.) are well known in the art. Next, the aforesaid oscillator generates a pulse signal for turning on or off the power transistor 54. Next, if the transistor 54 operates according to the aforesaid pulse, a voltage and a current are generated in proportion to the number of secondary windings of the transformer 28 due to a counter electromotive force caused by the current change of the primary winding.

Meanwhile, the DC power supply unit 200 includes a DC power source 56, a DC multitap transformer 58, an SMPS (Switching Mode Power Supply) circuit 72, and a power transistor 74. A secondary winding of the DC multitap transformer 58 is connected to various voltage output lines 120, 122, 124, etc., by a plurality of taps. The power voltage output lines 120, 122, 124, etc., are connected to the output voltage lines 102, 104, 106, etc., of the AC multitap transformer 28. Of course, while not shown for the sake of clarity in the figure, two additional taps and lines exist similar to lines 120, 122 and 124. These lines would be respectively coupled to output lines 108 and 110. The output voltage lines 120, 122, 124, are connected to rectifying diodes 60, 64, 68, and smoothing capacitors 62, 66, 70. Again, the additional two taps, not shown, also include their own rectifying diode and smoothing capacitor. The DC power supply unit 200 is implemented to render a corresponding product portable. A DC voltage 12V generated from the DC power source 56 may also be supplied from, for example, a cigarette lighter in a vehicle. The DC multitap transformer 58 transforms a DC voltage generated in the DC power source 56 to output voltages corresponding to the voltages at the secondary winding of the AC multitap transformer 28 in the AC power supply unit 100, and outputs the voltages to the respective voltage output lines 102, 104, 106, 108, and 110. The SMPS circuit 72 operates without feedback, and turns on or off the power transistor 74 according to a predetermined switching control operation equivalent to that performed by the switching controller 52. The SMPS circuit 72 is designed to perform a switching control operation without voltage variation even when a maximum load is set on a composite electronic product (e.g., a TV and a VCR are operated simultaneously in the case of a TVCR).

Because the AC/DC power supply circuit according to the first embodiment of the present invention can directly supply the FBT driving voltage 125V, there is no need for redesigning the FBT, as compared to the conventional AC/DC power supply circuit. In addition, the embodiment offers convenience in application with a portable composite electronic product since a DC voltage is available through an external source, e.g., from the battery of a vehicle through the cigarette lighter.

Figure 3:
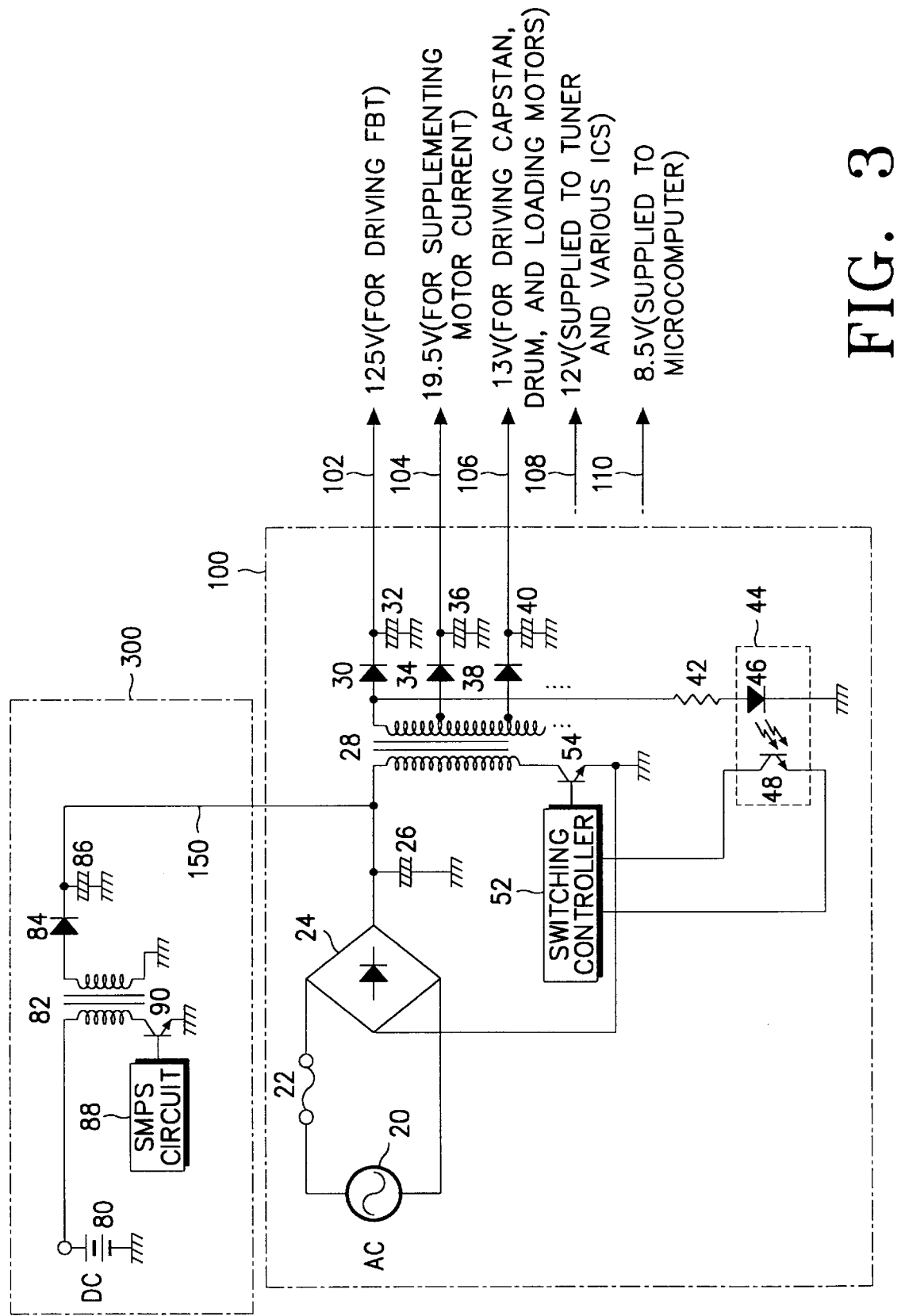
FIG. 3 is a schematic view of an AC/DC power supply circuit according to another embodiment of the present invention.

FIG. 3 is a schematic view of an AC/DC power supply circuit according to a second embodiment of the present invention. The AC/DC power supply circuit of FIG. 3 includes the AC power supply unit 100, as that of FIG. 2, and a DC power supply unit 300. The structure and operation of the components of the AC power supply unit 100 shown in FIG. 3 are the same as those of its counterpart shown in FIG. 2. However, the DC power supply unit 300 of FIG. 3 is different in structure from the DC power supply unit 200 of FIG. 2.

The DC power supply unit 300 of FIG. 3 has a DC power source 80, a DC transformer 82, an SMPS circuit 88, and a power transistor 90. A secondary winding of the DC transformer 82 is connected to a single output line 150. The output line 150 is connected to a leading end of the primary winding of the AC multitap transformer 28, that is, to a trailing end of the full wave rectifier 24. About 140V is applied to the output line 150, which is connected to a rectifying diode 84 and a smoothing capacitor 86. The DC power supply unit 300 is implemented to render a corresponding product more portable. The DC transformer 82 of FIG. 3 has a much smaller capacity than the DC multitap transformer 58 of FIG. 2.

Output voltages are constantly supplied to the output lines 102, 104, 106, 108, and 110 of the AC multitap transformer 28 despite variation of a voltage of the DC power source 80 between 10V and 30V because the output line 150 of the DC power supply unit 300 is connected after the full wave rectifier 24 of the AC power supply unit 100 and, thus, the power voltages output through the output lines of the AC multitap transformer 28 are adjusted to constant levels by the photocoupler 44, the switching controller 52, and the power transistor 54. Therefore, variation of the DC voltage of the DC power source 80 between 10–30V has no influence on the output voltages.

The AC/DC power supply circuit according to the second embodiment operates upon input of a DC voltage with the same operational effects as upon input of an AC voltage, thereby preventing voltage regulation deterioration involved in programmed recording at a DC voltage. Therefore, in the case of a composite electronic product such as a TVCR, a VCR can operate with a TV turned off, and programmed recording can be performed even with a DC power supply, thus reducing power consumption. Further, as previously mentioned, the DC power supply unit 300 can adaptively cope with power load variation. Still further, the influence of noise generated during converting an input AC voltage to a DC voltage can be minimized, and the DC power supply unit 300 may be implemented with fewer parts as compared with the novel AC/DC power supply circuit shown in FIG. 2 according to the first embodiment of the present invention. It is to be appreciated that the AC/DC power supply circuit according to the first and second embodiments of the present invention obviates the need for redesigning an FBT depending on product sets or loads.

While the present invention has been described in detail in an exemplary application to a composite electronic product TVCR with reference to the specific embodiments, it is to be clearly understood that many variations can be made by anyone skilled in the art within the scope and spirit of the present invention. That is, the present invention is applicable to a VCR, a camcorder, and the like. Thus, the appropriate scope hereof is deemed to be in accordance with the claims as set forth below.

What is claimed is:

1. An AC/DC power supply circuit applied to a composite electronic product, comprising:

an AC power supply unit having a rectifier for rectifying an input AC voltage to provide a first voltage, means for applying the first voltage to an output line of the rectifier, a multitap AC transformer for transforming the first voltage to a plurality of output voltages suitable for the composite electronic product, and an output voltage controller for controlling a primary voltage of the AC transformer by means of a secondary voltage thereof, in order to control the output voltages; and a DC power supply unit having a DC power source for supplying a DC voltage, means for converting the DC voltage to a power supply voltage to provide a second voltage, said second voltage corresponding to the primary voltage of the AC transformer, and means for applying the second voltage to the output line of the rectifier of the AC power supply unit.

2. The AC/DC power supply circuit as claimed in claim 1, wherein the DC voltage is between the range of about 10–30V.

3. An AC/DC power supply circuit applied to a composite electronic product, comprising:

an AC power supply unit having a rectifier for rectifying an input AC voltage, a multitap AC transformer for transforming the rectified AC voltage to a plurality of output voltages suitable for the composite electronic product, and an output voltage controller for controlling a primary voltage of the transformer by means of a secondary voltage thereof, in order to control the output voltages; and a DC power supply unit having a DC power source for supplying a predetermined DC voltage, means for converting the DC voltage to a plurality of output voltages corresponding to the plurality of output voltages generated by the AC transformer, and means for directly applying the converted voltages to a plurality of output lines at a secondary side of the AC transformer of the AC power supply unit.

* * * * *